United States Patent [19]

Vidovic

[11] 3,843,957

[45] Oct. 22, 1974

[54] VIDEO PROCESSING CIRCUIT

[75] Inventor: Nikola Vidovic, Santa Clara, Calif.

[73] Assignee: International Video Corporation, Sunnyvale, Calif.

[22] Filed: Apr. 30, 1973

[21] Appl. No.: 355,758

[52] U.S. Cl. .......... 358/21
[51] Int. Cl. .......... H04n 9/02
[58] Field of Search .......... 178/5.4 R

[56] References Cited

UNITED STATES PATENTS 3,586,759 6/1971 Ross .......... 178/5.4 R

*Primary Examiner*—Richard Murray
*Attorney, Agent, or Firm*—Limbach, Limbach & Sutton

[57] ABSTRACT

A circuit for removing sync pulses from a composite color video signal and for black level clipping the luminance component of said signal without affecting the chrominance component. The composite signal is applied to an input of an amplifier having negative feedback to the same input where the output is also taken. The feedback path includes a band stop filter in the chrominance frequency band and level sensing circuitry. All portions of the signal, except the chrominance component, which are negative with respect to a selected blanking level are attenuated by the amplifier and feedback action.

3 Claims, 5 Drawing Figures

VIDEO PROCESSING CIRCUIT

BACKGROUND OF THE INVENTION

The present invention relates to television systems and more particularly to a circuit for suppressing the negative going synchronizing (sync) pulses and luminance (black and white) information in a composite color television signal without affecting either the negative going chrominance (color) information or the negative portions of the color burst.

The circuit functions both as a black level clipper and a sync stripper.

In the processing of composite color television signals, especially such signals reproduced from a videotape recorder, it is a common practice to "strip" off the sync pulses from the reproduced signal and to replace them with "cleaner" more perfectly formed pulses from a stable generator. Because the sync pulses are negative-going with respect to the television signal blanking level a simple clipper circuit with its clipping level at the blanking level (or black level) is adequate to strip the sync pulses in the case of a black and white television signal (carrying no color information).

Where the sync is stripped from a color television signal or where black level clipping of the luminance information is desired it has been necessary to separate the luminance information (including sync pulses) from the chrominance information and to apply black level clipping only to the luminance information. Black level clipping of the chrominance information is undesirable because the chrominance signal very often drops below the blanking level, for example, the color burst, magenta, red and blue color bar signals, etc. Processing the chrominance signal through any nonlinear or clipping circuit results in severe differential phase and gain which causes unacceptable errors in the reproduced color of the signal.

SUMMARY OF THE INVENTION

In accordance with the teachings of the present invention black level clipping of the luminance information portions of a composite color television and sync stripping is achieved without affecting the chrominance information.

The color television signal to be processed is applied to the inverting input of an amplifier with negative feedback and taking the output signal from the same input. The feedback path includes a band stop filter covering the chrominance information band of frequencies and level sensing circuitry. Thus, for a positive input the feedback path is open and the signal is unaffected. For a negative input signal which is not in the chrominance information frequency band the signal is reduced by the feedback factor (which depends on the feedback network characteristics and the amplifier gain). The circuit action provides a linear attenuation of negative going signals that are not in the chrominance band: the circuit is not a clamp switch.

These and other advantages of the invention will be better understood as the specification and drawings are read and understood.

DESCRIPTION OF THE PREFERRED EMBODIMENTS

Figure 2:
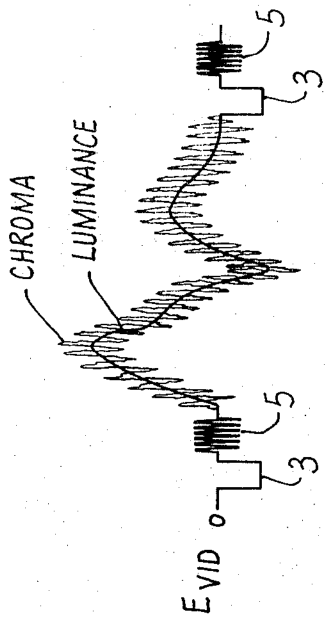
FIG. 2 is a schematic waveform showing a composite color television input signal to be processed.
Figure 1:
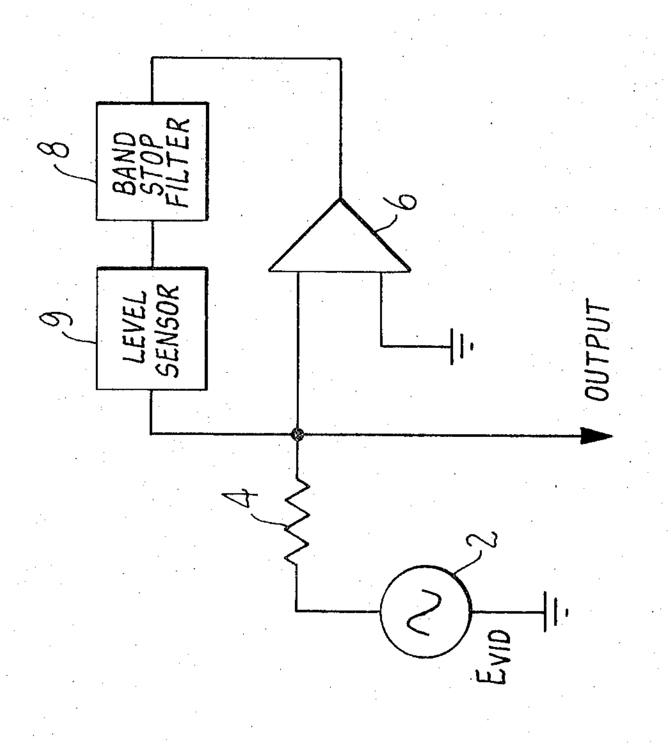
FIG. 1 is a block diagram of a simplified embodiment of the invention.

Referring now to FIG. 1 of the drawings, wherein a simplified block diagram of an embodiment of the invention is shown. A signal source 2 applies a voltage $E_{vid}$ comprising a composite color television signal as shown schematically in the waveform of FIG. 2 to source resistor 4 which is connected to the inverting input of an amplifier 6. The composite color video signal can be according to any color television standard such as NTSC, PAL, PAL–M, SECAM, etc. The signal shown in FIG. 2 is intended to be representative of a typical signal and is shown including horizontal sync pulses 3, color subcarrier bursts 5 (which, of course, are fixed at different frequencies in the various systems — about 3.58MHz in NTSC, about 4.43MHz in PAL, etc.). The luminance portion of the information signal is shown varying above and below the blanking level, shown as O. The chrominance information is the high frequency information shown varying above and below the lower frequency luminance signal. These composite color video signal characteristics are well known in the art.

Figure 3:
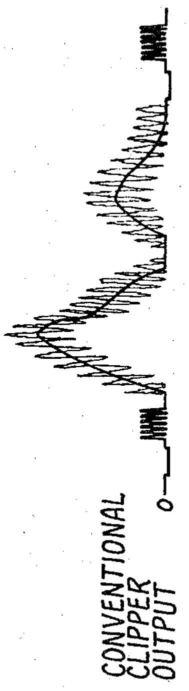
FIG. 3 is a schematic waveform showing a composite color television signal that has been processed by a black level clipper circuit.

To digress briefly, a conventional black level clipper which is simply a clamp set at the zero level results in a clipped signal as shown in FIG. 3 wherein not only are the horizontal sync pulses and the negative-going part of the luminance signal substantially removed, but also the negative portions of the subcarrier burst and the negative-going chrominance information are also removed. Such a signal is unusable. It is desired to remove the sync signals and the negative-going part of the luminance signal without affecting the chrominance information and subcarrier bursts.

Figure 4:
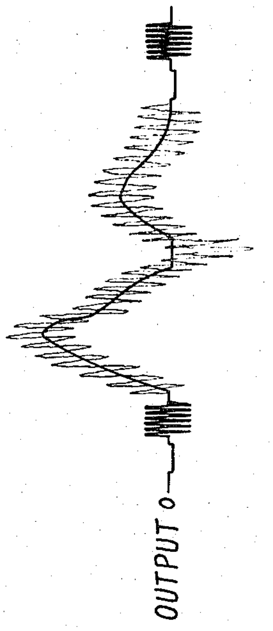
FIG. 4 is a schematic waveform showing a composite color television signal that has been processed by a circuit according to the present invention.

Returning to FIG. 1, the inverting input of differential amplifier 6 is grounded and the amplifier output is fed through a feedback network 8 with characteristics designated B to the noninverting input of amplifier 6 from which the output is taken. Grounding the inverting input provides a zero volt blanking level. This level can be changed as desired. The feedback network 8 includes a band stop filter selected to substantially attenuate the chrominance information and subcarrier burst. Because such information is at a higher frequency than the luminance information and sync signals such a filter is easily implemented in accordance with well known teachings in the art. The feedback loop further includes a level sensor 9 which closes the loop for negative input signals and opens the loop for positive input signals. The resulting output is shown in FIG. 4 where it will be noted that the sync pulses are substantially removed and the negative-going luminance component of the signal is substantially removed while the color bursts and negative-going chrominance information are unaffected.

Amplifier 6 has a high open loop gain. When a negative signal is present at the amplifier input, the feedback path is closed (except if the negative signal is within the range of the band stop filter in the feedback network 8) and the amplifier input impedance is reduced by the feedback factor $\beta$A, where A is the amplifier gain. If the factor $\beta$A is 20, then the negative voltage is linearly reduced 20 times. The feedback path is open for positive input signals. Thus the positive portions of a video signal are passed and the negative portions, which are not in the chrominance band, are attentuated.

Figure 5:
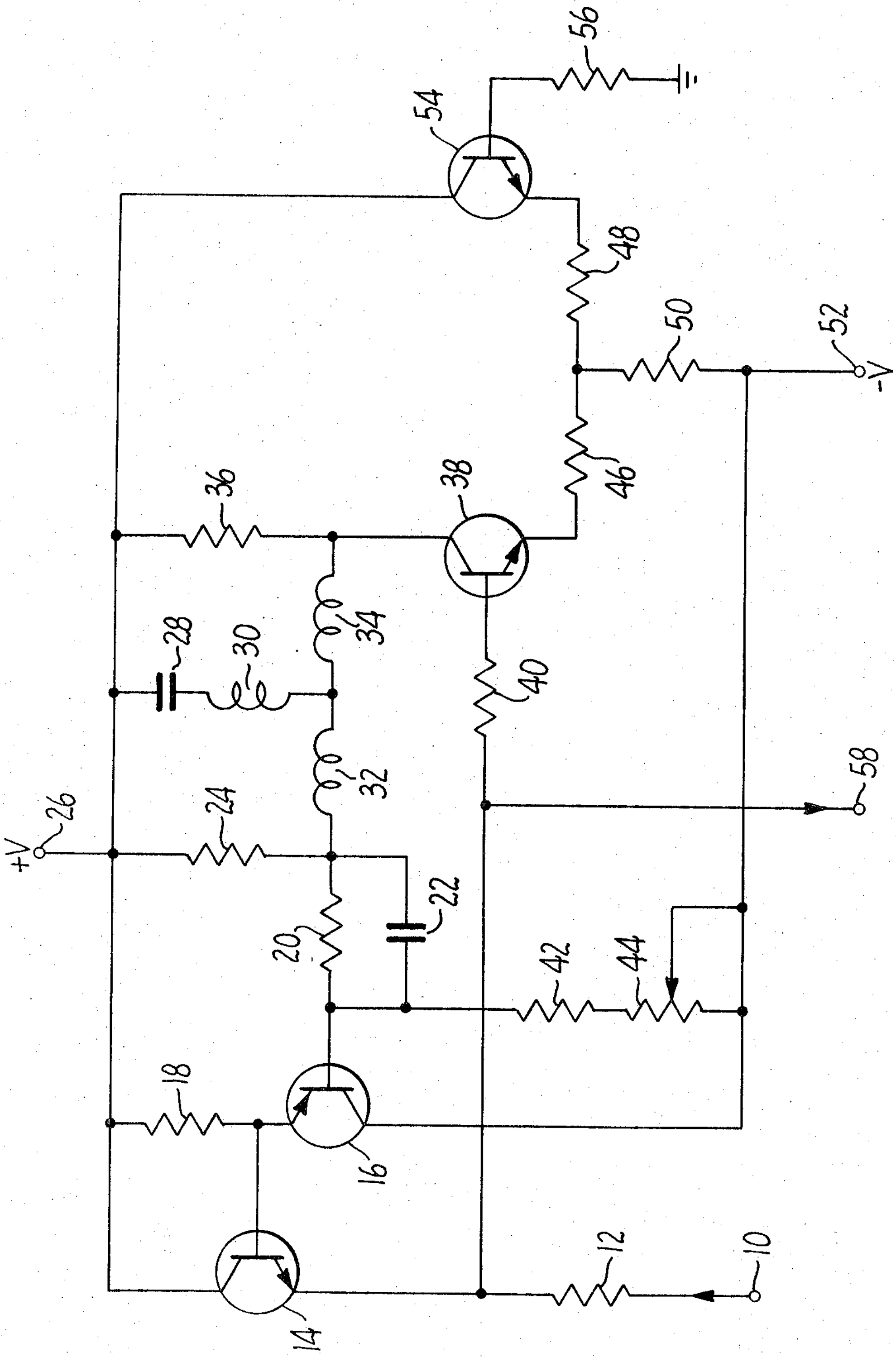
FIG. 5 is a schematic circuit diagram of an embodiment of the invention.

A more detailed schematic diagram of an embodiment of the invention is shown in FIG. 5. NPN transistors 38 and 54 correspond to the amplifier 6 of FIG. 1. The feedback path is through Darlington emitter followers 14 and 16, which are NPN and PNP, respectively, so that their base-emitter voltage offsets cancel each other as do the two base-emitter voltage offset temperature coefficients. Emitter followers 14 and 16 function as the level sensor 9 of FIG. 1.

The input video signal is applied at terminal 10 through resistors 12 and 40 to the base of transistor 38 in the differential amplifier. The base of the other differential amplifier transistor 54 is referenced to ground through resistor 56. If the blanking level is other than zero, resistor 56 is connected to a voltage equal to the desired blanking level. The emitters of transistors 38 and 54 are connected to a common junction through resistors 46 and 48, respectively, and the common junction is connected to a negative voltage source −V through resistor 50. The collectors of transistors 38 and 54, which provide the output of the differential amplifier, are connected to a feedback network which includes a band stop filter in the chrominance frequency band. The feedback network includes a resistor 36 between said collectors, the series connection of an inductor 34, and inductor 32 and a parallel resistor 20 and capacitor 22 between the collector of transistor 38 and the base of transistor 16, a series inductor 30 and capacitor 28 between the junction of inductors 32, 34 and the collector of transistor 54, and a resistor 24 between the junction of inductor 32 and the resistor 20, capacitor 22 and the collector of transistor 54. Said last-mentioned collector is also connected to a terminal 26 for connection to a positive voltage source +V and is further connected to the emitter of transistor 16 through a resistor 18 and to the collector of transistor 14. The base of transistor 14 is connected to the emitter of transistor 16, while the emitter of transistor 14 is connected to the junction of resistors 12, 40 and also to the output terminal 58. The base of transistor 16 is also connected through series resistor 42 and potentiometer 44 to −V terminal 52 and to its collector. Potentiometer 44 in the Darlington emitter follower circuit should be adjusted so that the DC level at the base of transistor 54 is equal to the blanking level of the input video signal. This provides a fine adjustment of the blanking level which is principally set by the voltage reference to the noninverting input of the differential amplifier through resistor 56. Thus video signals positive with respect to the blanking level (negative at the input 10 — due to inversion) will pass through the Darlington stage and be attenuated at the emitter of 14. Negative portions of the signal (positive at input 10) turn transistor 14 off and are thus unaffected.

By way of example only, in a practical embodiment of the circuit of FIG. 5 the following circuit component values were used:

| | |
|---|---|
| resistor 12 | 220 Ω |
| resistor 18 | 10 KΩ |
| resistor 20 | 20 KΩ |
| capacitor 22 | 100 μF. |
| resistor 24 | 1 KΩ |
| capacitor 28 | 56 pF. |
| inductor 30 | 22 μH |
| inductor 32 | 27 μH |
| inductor 34 | 27 μH |
| resistor 36 | 1 KΩ |
| resistor 40 | 100 Ω |
| resistor 42 | 30 KΩ |
| potentiometer 44 | 2 KΩ |
| resistor 46 | 10 Ω |
| resistor 48 | 10 Ω |
| resistor 50 | 560 Ω |
| resistor 56 | 100 Ω |
| + V | +12 volts |
| − V | −12 volts |

These circuit values are given by way of example only and are not to be considered limiting.

Modifications of the disclosed embodiments within the teachings of the invention will occur to those of ordinary skill in the art. The invention is therefore to be limited only by the scope of the appended claims.

I claim:

1. Apparatus for processing a composite color video signal to attenuate the non-chrominance components excursions of the signal which are negative with respect to a selected blanking level comprising amplifier means having inverting and non-inverting inputs and an output, means for applying said composite color video signal to said inverting input, means for connecting said non-inverting input to a selected blanking level voltage, negative feedback means connected between said amplifier output and said inverting input for providing an open feedback path for video signal portions above said selected blanking level and a closed feedback path for video signal portions below said selected blanking level, and means for taking the processed output signal at said inverting amplifier input.

2. Apparatus according to claim 1 wherein said feedback means includes band stop filter means in the chrominance frequency band of said composite color video signal.

3. Apparatus according to claim 2 wherein said feedback means further includes a pair of opposite polarity Darlington configuration emitter followers between said band stop filter means and said inverting amplifier input.

* * * * *